(12) United States Patent
Kajihara et al.

(10) Patent No.: US 8,957,996 B2
(45) Date of Patent: Feb. 17, 2015

(54) SOLID-STATE IMAGING DEVICE AND CAMERA SYSTEM

(75) Inventors: Takumi Kajihara, Nagasaki (JP); Junichi Inutsuka, Nagasaki (JP)

(73) Assignee: Sony Corporation (JP)

(*) Notice: Subject to any disclaimer, the term of this patent is extended or adjusted under 35 U.S.C. 154(b) by 777 days.

(21) Appl. No.: 13/086,782

(22) Filed: Apr. 14, 2011

(65) Prior Publication Data

US 2011/0279724 A1 Nov. 17, 2011

(30) Foreign Application Priority Data

May 13, 2010 (JP) ................................ 2010-111306

(51) Int. Cl.
*H04N 9/64* (2006.01)
*H04N 5/217* (2011.01)
*H04N 5/3745* (2011.01)
*H04N 5/365* (2011.01)

(52) U.S. Cl.
CPC ............ *H04N 5/3745* (2013.01); *H04N 5/3658* (2013.01)
USPC ......................................... 348/245; 348/241

(58) Field of Classification Search
USPC ....................................................... 348/245
See application file for complete search history.

(56) References Cited

U.S. PATENT DOCUMENTS

| | | | | |
|---|---|---|---|---|
| 6,661,929 B1* | 12/2003 | Smith | ............................ | 348/241 |
| 7,667,735 B2* | 2/2010 | Ikeyama | ................... | 348/208.12 |
| 7,872,677 B2* | 1/2011 | Kume | ............................ | 348/243 |
| 2004/0233310 A1* | 11/2004 | Egawa et al. | ................. | 348/301 |
| 2009/0046188 A1* | 2/2009 | Koseki et al. | ................. | 348/302 |
| 2010/0091160 A1* | 4/2010 | Murakami | .................... | 348/301 |

FOREIGN PATENT DOCUMENTS

JP 2005-278135 10/2005

OTHER PUBLICATIONS

Woodward Yang et al.; An Integrated 800x600 CMOS Imaging System; ISCC99/Session 17/Paper WA 17.3; 1999 IEEE International Solid-State Circuits Conference.

* cited by examiner

*Primary Examiner* — Jason Flohre
(74) *Attorney, Agent, or Firm* — Sheridan Ross P.C.

(57) ABSTRACT

A solid-state imaging device includes: a pixel unit in which a plurality of pixels that perform photoelectric conversion are arranged in the form of a matrix; a pixel signal reading unit performing reading of a pixel signal in a signal line from the pixel unit in the unit of plural pixels, and performing column signal processing with respect to an input signal; and an evaluation pattern generation unit receiving a control signal and a signal line interception signal and generating a pseudo-evaluation pattern according to the control signal.

7 Claims, 11 Drawing Sheets

WHITE HIGH-LUMINANCE HORIZONTAL
BAND ON BLACK BACKGROUND

FIG.4

BLACK HIGH-LUMINANCE HORIZONTAL
BAND ON WHITE BACKGROUND

FIG.5

WHITE HIGH-LUMINANCE HORIZONTAL BAND
EVALUATION PATTERN ON BLACK BACKGROUND

FIG.6

BLACK HIGH-LUMINANCE HORIZONTAL BAND
EVALUATION PATTERN ON WHITE BACKGROUND

SOLID-STATE IMAGING DEVICE AND CAMERA SYSTEM

BACKGROUND OF THE INVENTION

1. Field of Invention

The present invention relates to a solid-state imaging device which is represented by a CMOS image sensor and a camera system.

2. Description of the Related Art

A CMOS image sensor may be manufactured using the same manufacturing process as a general CMOS integrated circuit, and may be driven by a single power supply. Also, an analog circuit or a logic circuit which uses a CMOS process may be mixed in the same chip.

Accordingly, the CMOS image sensor has great merit in that the number of peripheral ICs may be reduced.

In a CCD output circuit, one-channel (ch) output using an FD (Floating Diffusion) amplifier having an FD layer is the mainstream.

For this, the CMOS image sensor has an FD amplifier for each pixel, and the main stream of its output is a column parallel output type which selects any one row in the pixel array and simultaneously reads them in a column direction.

This is because since it is difficult to obtain sufficient driving capability in the FD amplifier arranged in the pixel, it is necessary to lower the data rate, and thus parallel processing is advantageous.

Several pixel signal read (output) circuits of column parallel output type CMOS image sensors have been actually proposed.

One of the most advanced types is a type which is provided with an analog-digital conversion device (hereinafter referred to as an "ADC" (Analog Digital Converter)) for each column and extracts a pixel signal as a digital signal.

The CMOS image sensor mounting such a column parallel type ADC thereon, for example, is disclosed in W. Yang et al., "An Integrated 800×600 CMOS Image System," ISSCC Digest of Technical Papers, pp. 304-305 February, 1999) (non-patent document 1), or JP-A-2005-278135 (patent document 1).

Figure 1:
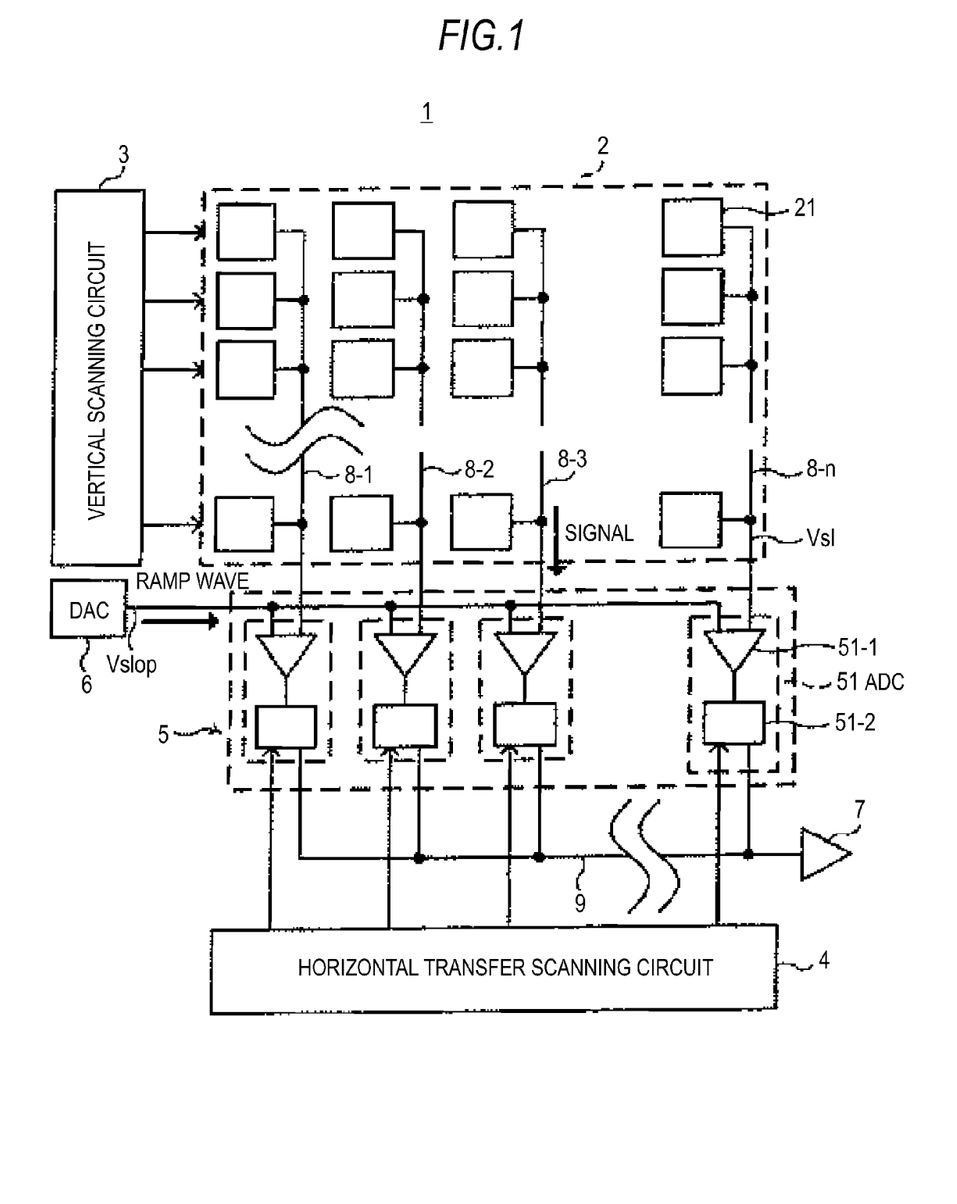
FIG. 1 is a block diagram illustrating a configuration example of a solid-state imaging device (CMOS image sensor) mounting a column parallel ADC thereon.

FIG. 1 is a block diagram illustrating the configuration example of a solid-state imaging device (CMOS image sensor) mounting a column parallel ADC thereon.

As illustrated in FIG. 1, this solid-state imaging device 1 includes a pixel unit 2, a vertical scanning circuit 3, a horizontal transfer scanning circuit 4, and a column processing circuit group 5 composed of ADC groups.

Further, the solid-state imaging device 1 includes a digital-analog conversion device (hereinafter referred to as a "DAC" (Digital-Analog Converter)) 6, and an amplifier circuit (S/A) 7.

In the pixel unit 2, unit pixels 21, each of which includes a photodiode (a photoelectric conversion device) and an amplifier in the pixel, are arranged in the form of a matrix.

In the column processing circuit group 5, a plurality of column processing circuits 51, which form the ADC for each column, are arranged for the respective columns.

Each column processing circuit (ADC) 51 has a comparator 51-1 which compares a reference signal RAMP (Vslop) that is a ramp waveform (RAMP) obtained by changing a reference signal generated by the DAC 6 to a stepwise form with an analog signal that is obtained from a pixel through a vertical signal line for each row line.

Further, each column processing circuit 51 has a counter latch (memory) 51-2 that counts the comparison time of the comparator 51-1 and maintains the result of count.

The column processing circuit 51 has an n-bit digital signal conversion function, and is arranged for vertical signal lines (column lines) 8-1 to 8-n. Accordingly, a column parallel ADC block is constructed.

Each output of the memory 51-2 is connected, for example, to a horizontal transfer line 9 having a width of k bits.

Also, K amplifier circuits 7 that correspond to the horizontal transfer line are arranged.

Figure 2:
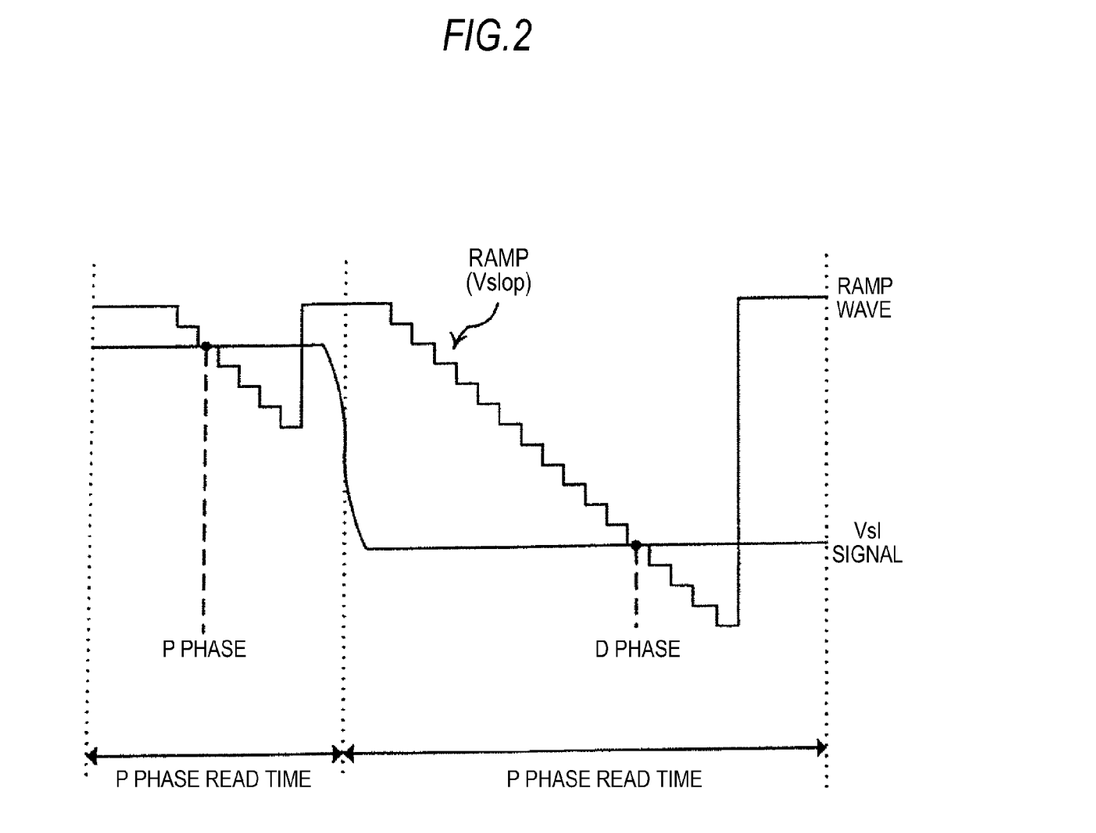
FIG. 2 is a diagram illustrating a timing chart of the circuit of FIG. 1.

FIG. 2 is a diagram illustrating a timing chart of the circuit of FIG. 1.

In each column processing circuit (ADC) 51, an analog signal (electric potential Vsl) read from the vertical signal line 8 is compared with a reference signal RAMP (Vslop) that is changed in a stepwise manner by the comparator 51-1 arranged for each column.

In this case, until the output of the comparator 51-1 is reversed through crossing of the analog electric potential Vsl and the level of the reference signal RAMP (Vslop), the counter latch 51-2 performs counting, and the electric potential (analog signal) Vsl of the vertical signal line 8 is converted into a digital signal (AD-converted).

This AD conversion is performed twice for each reading.

At the first time, the reset level (P phase) of the unit pixel 21 is read from the vertical signal line 8(-1 to -n), and the AD conversion thereof is executed.

At the reset level (P phase), the difference for each pixel is included.

At the second time, the photoelectrically converted signal for each unit pixel 21 is read from the vertical signal line 8 (-1 to -n) (D phase), and then the AD conversion thereof is executed.

Since the difference for each pixel is included even in the D phase, a correlation double sampling is realized by executing (D phase level—P phase level).

The signal converted into the digital signal is written in the counter latch 51-2, is sequentially read in the amplifier circuit 7 through the horizontal transfer line 9 by the horizontal (column) transfer scanning circuit 4, and then is finally output.

As described above, the column parallel output processing is performed.

SUMMARY OF THE INVENTION

As an example of the solid-state imaging device, the column parallel ADC mount-type solid-state imaging device has been exemplified. However, the solid-state imaging device is not limited to the column parallel ADC mount-type, and a column CDS type or the like may be included. In this case, a horizontal line that is a so-called high luminance horizontal band may occur.

The high luminance horizontal band is classified as a kind of horizontal line.

Figure 3:
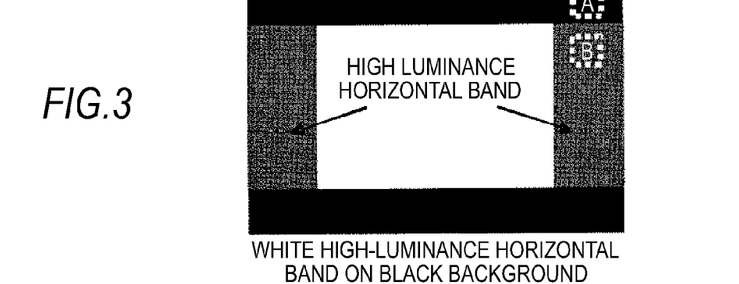
FIG. 3 is a diagram illustrating a white high-luminance horizontal band on a black background.
Figure 4:
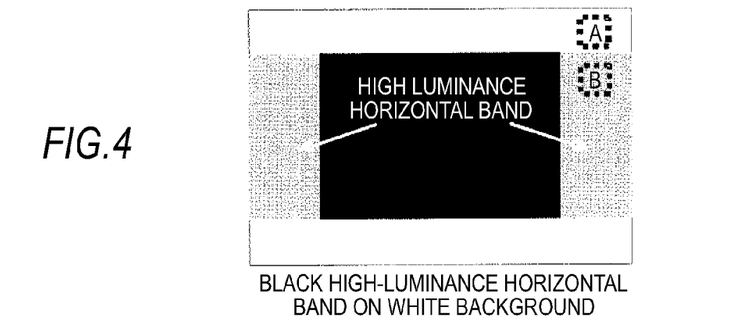
FIG. 4 is a diagram illustrating a black high-luminance horizontal band on a white background.

The high luminance horizontal band means a line extending in the left and right directions from a white image in the case where a white image is present in a black background as shown in FIG. 3. By contrast, the high luminance horizontal band means a line extending in the left and right directions from a black image in the case where the black image is present in a white background as shown in FIG. 4.

The former is called a "white high-luminance horizontal band on a black background", and the latter is called a "black high-luminance horizontal band on a white background.

First, a method of quantitatively measuring a white high-luminance horizontal band on a black background is, as illustrated in FIG. 3, to calculate the difference between output average values in an area A in which the whole of the same row does not react to the light and is fixed to the black level and in an area B in which most of the same row reacts on the light.

Figure 5:
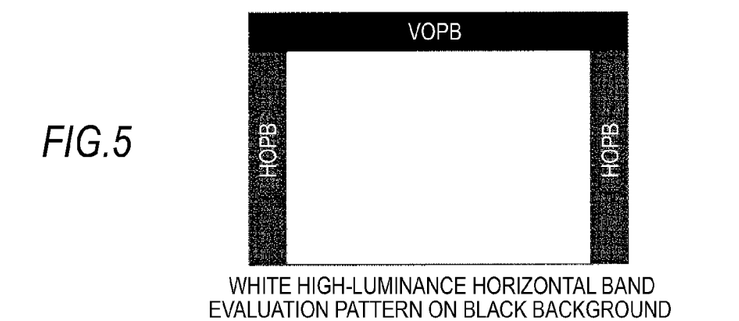
FIG. 5 is a diagram illustrating an evaluation pattern of a white high-luminance horizontal band on a black background of FIG. 3.

In the imaging device, as illustrated in FIG. 5, optical black areas VOPB and HOPB are used in place of the two areas, and an external operation, such as an artificial light shielding of the imaging device surface on purpose, is unnecessary in order to make an evaluation pattern.

On the other hand, a method of quantitatively measuring a black high-luminance horizontal band on a white background is, as illustrated in FIG. 4, to calculate a difference between output average values in an area A in which the whole of the same row reacts on the light and in an area B in which most of the same row does not react on the light and is fixed to the black level.

Figure 6:
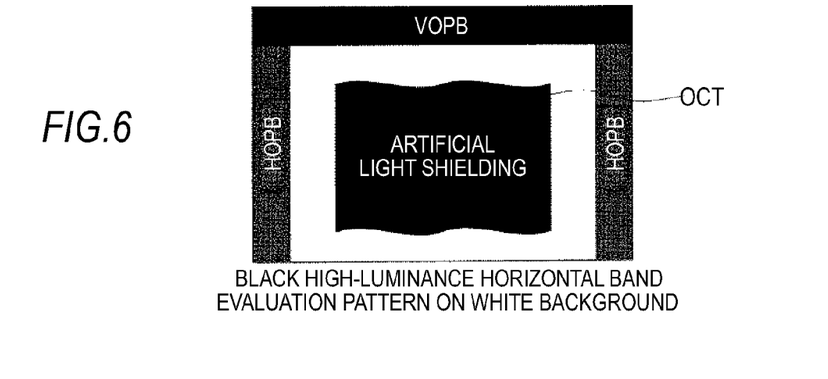
FIG. 6 is a diagram illustrating an evaluation pattern of a black high-luminance horizontal band on a white background of FIG. 4 using a light shielding unit.

In the imaging device, as illustrated in FIG. 6, an external operation, such as an artificial light shielding of a portion of the surface of the imaging device by a light shielding unit OCT, is necessary in order to generate the two areas.

However, since it is difficult to achieve a complete light shielding by an external operation, there is a problem in realizing the quantitative evaluation.

Accordingly, it is desirable to provide a solid-state imaging device and a camera system which can present a light shielding state without the necessity of an external operation and can perform a quantitative evaluation which has reproducibility.

According to an embodiment of the invention, a solid-state imaging device includes a pixel unit in which a plurality of pixels that perform photoelectric conversion are arranged in the form of a matrix; a pixel signal reading unit performing reading of a pixel signal in a signal line from the pixel unit in the unit of plural pixels, and performing column signal processing with respect to an input signal; and an evaluation pattern generation unit receiving a control signal and a signal line interception signal and generating a pseudo-evaluation pattern according to the control signal.

According to another embodiment of the invention, a camera system includes a solid-state imaging device; and an optical system forming an image of an object on the solid-state imaging device, wherein the solid-state imaging device includes a pixel unit in which a plurality of pixels that perform photoelectric conversion are arranged in the form of a matrix; a pixel signal reading unit performing reading of a pixel signal in a signal line from the pixel unit in the unit of plural pixels, and performing column signal processing with respect to an input signal; and an evaluation pattern generation unit receiving a control signal and a signal line interception signal and generating a pseudo-evaluation pattern according to the control signal.

According to the embodiments of the invention as described above, the light shielding state is presented without the necessity of an external operation, and a quantitative evaluation which has reproducibility is performed.

DESCRIPTION OF THE PREFERRED EMBODIMENTS

Hereinafter, embodiments of the invention will be described in detail with reference to the accompanying drawings.

The explanation will be made in the following order.
1. Overall configuration example of a solid-state imaging device
2. Configuration example of a column ADC
3. First configuration example of a high luminance evaluation pattern generation unit
4. Second configuration example of a high luminance evaluation pattern generation unit
5. Configuration example of a camera system FIG. 7 is a block diagram illustrating a configuration example of a solid-state imaging device (CMOS image sensor) mounting a column parallel ADC thereon according to an embodiment of the invention.

Figure 8:
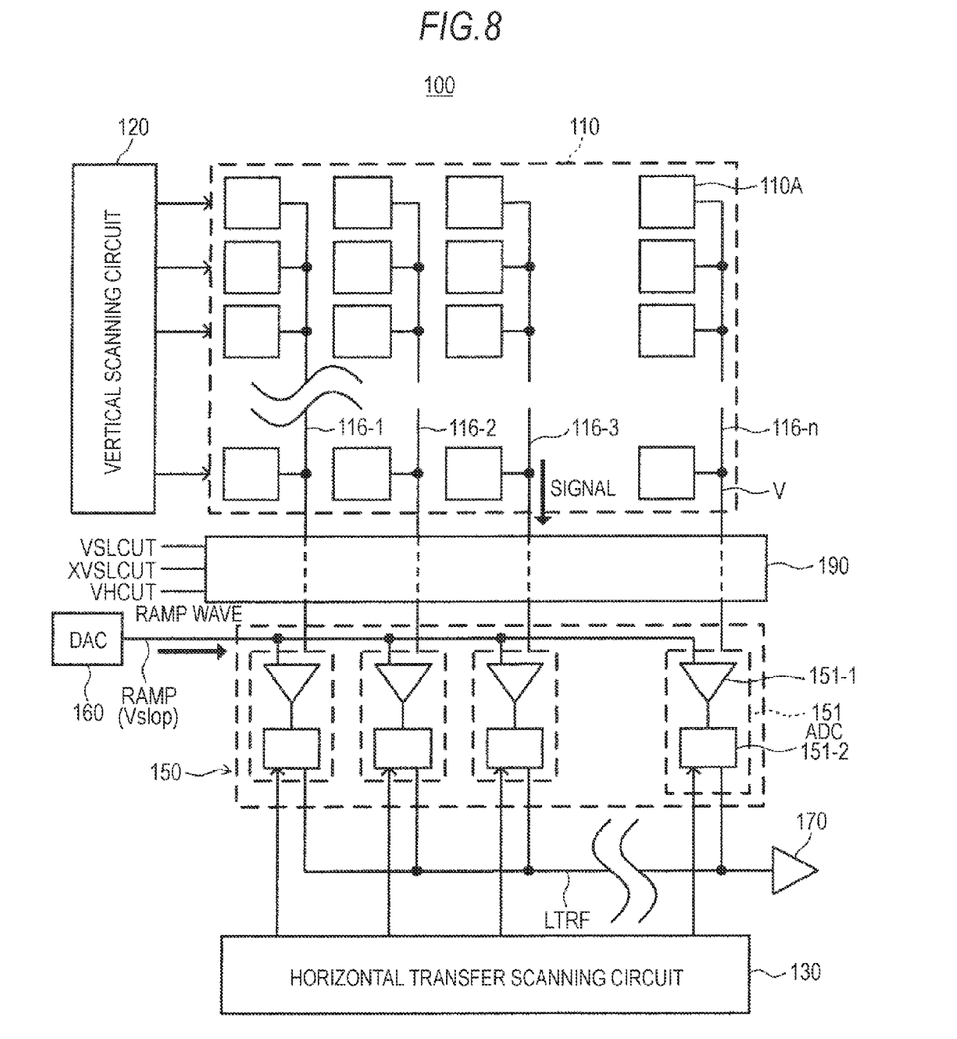
FIG. 8 is a block diagram illustrating in more detail an ADC group in a solid-state imaging device (CMOS image sensor) mounting a column parallel ADC thereon of FIG. 7.

FIG. 8 is a block diagram illustrating in more detail an ADC group in a solid-state imaging device (CMOS image sensor) mounting a column parallel ADC thereon.

<1. Overall Configuration Example of a Solid-State Imaging Device>

Figure 7:
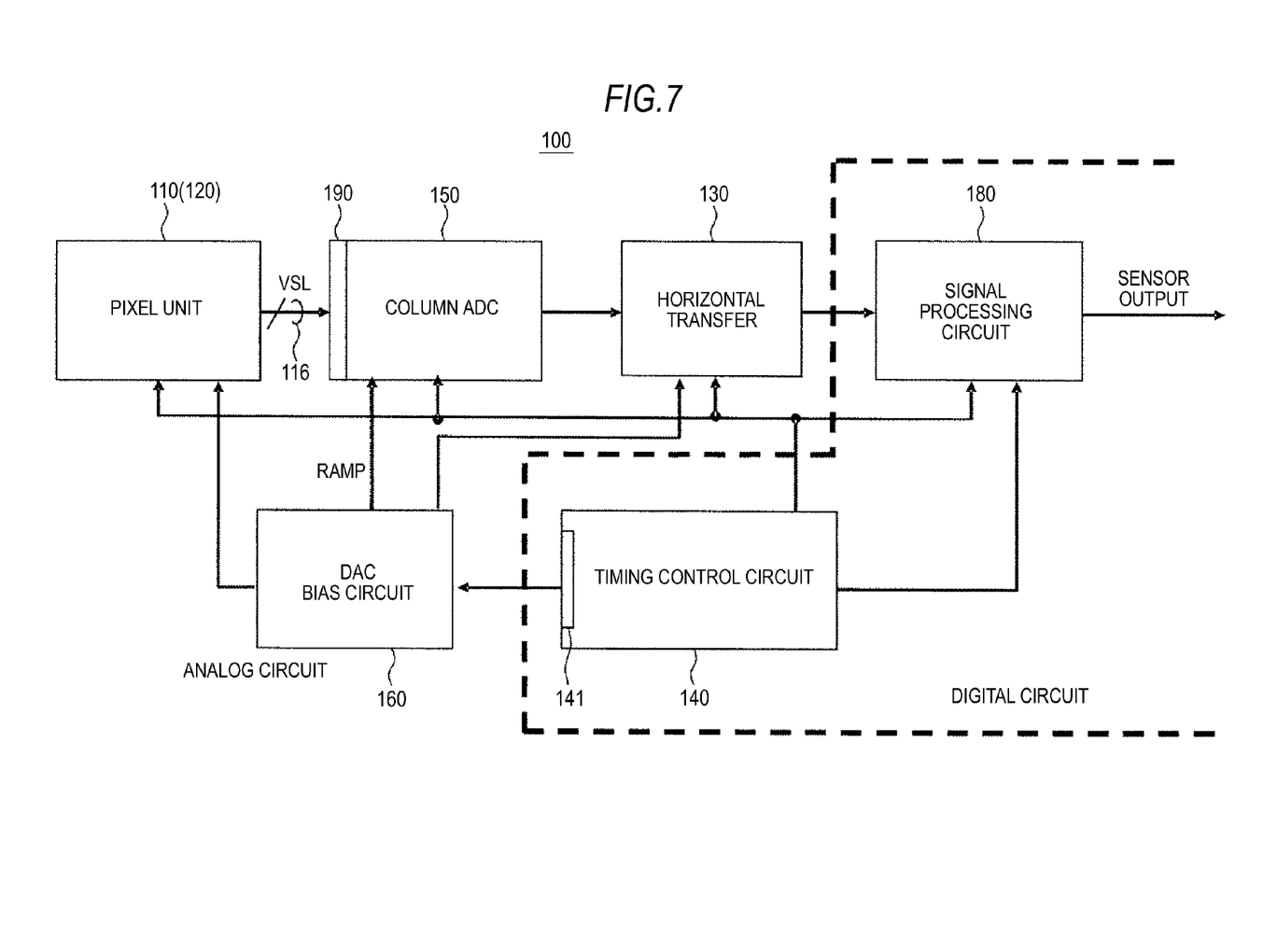
FIG. 7 is a block diagram illustrating a configuration example of a solid-state imaging device (CMOS image sensor) mounting a column parallel ADC thereon according to an embodiment of the invention.

This solid-state imaging device 100, as illustrated in FIGS. 7 and 8 includes a pixel unit 110 as an imaging unit, a vertical scanning circuit 120, a horizontal transfer scanning circuit 130, and a timing control circuit 140.

Further, the solid-state imaging device 100 includes a column processing circuit group 150 that is an ADC group as a pixel signal reading circuit, and a DAC and bias circuit 160 that includes a DAC (digital-analog conversion device) 161.

Also, an adjustment unit includes functions of the timing control circuit 140, the column processing circuit group (ADC group) 150, and the DAC and bias circuit 160.

The solid-state imaging device 100 includes an amplifier circuit (S/A) 170, a signal processing circuit 180, and a high luminance evaluation pattern generation unit 190.

Among these configuration devices, the pixel unit 110, the vertical scanning circuit 120, the horizontal transfer scanning circuit 130, the column processing circuit group (ADC group) 150, the DAC and bias circuit 160, and the amplifier circuit (S/A) 170 are configured by analog circuits.

Also, the timing control circuit 140 and the signal processing circuit 180 are configured by digital circuits.

The high luminance evaluation pattern generation unit 190 does not require an external operation in light shielding with respect to a high luminance horizontal band, and thus generates an evaluation pattern capable of performing a quantitative evaluation with reproducibility.

Also, the high luminance evaluation pattern generation unit 190 does not require an external operation in light shielding with respect to a high luminance horizontal band, and thus generates an evaluation pattern capable of performing a quantitative evaluation with reproducibility and simultaneously measuring a white high-luminance horizontal band on a black background and a black high-luminance horizontal band on a white background as one sheet of image.

A high luminance evaluation pattern that is artificially generated by the high luminance evaluation pattern generation unit 190, for example, is reproduced by the signal processing circuit 180.

Here, the artificially generated evaluation pattern means a pattern that is made by internally processing a pattern which is equal to the evaluation pattern that is made by external light shielding.

The detailed configuration and function of the high luminance evaluation pattern generation unit 190 will be described later.

In the pixel unit 110, a plurality of unit pixels 110A, each of which includes a photodiode (photoelectric conversion device) and an amplifier in the pixel, are arranged in a two-dimensional form (matrix form) with m rows and n columns.

[Configuration Example of a Unit Pixel]

Figure 9:
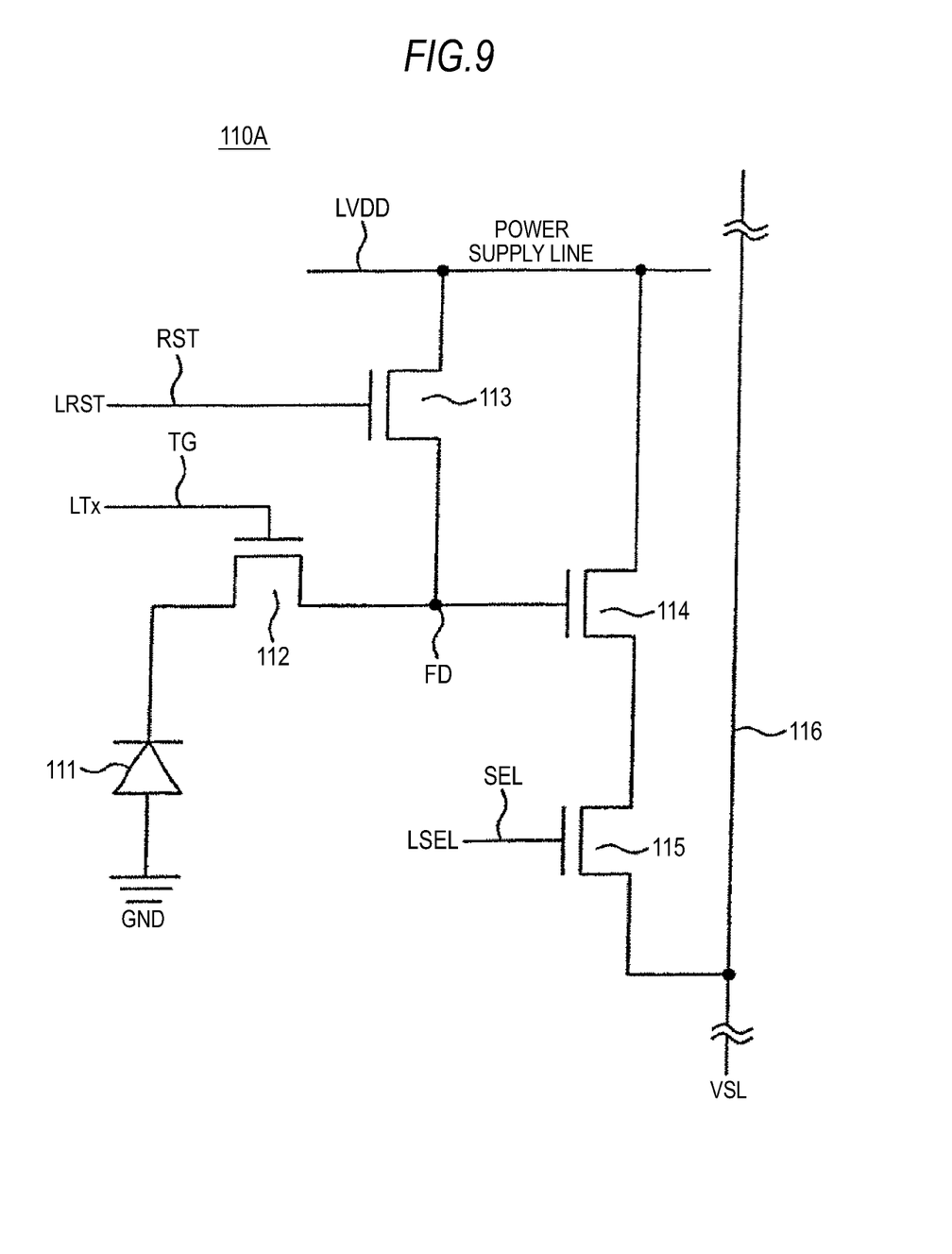
FIG. 9 is a diagram illustrating an example of a pixel of a CMOS image sensor composed of four transistors according to an embodiment of the invention.

FIG. 9 is a diagram illustrating an example of a pixel of a CMOS image sensor composed of four transistors according to an embodiment of the invention.

The unit pixel 110A, for example, has a photodiode 111 as a photoelectric conversion device.

The unit pixel 110A includes four transistors as active devices: a transfer transistor 112 as a transfer device, a reset transistor 113 as a reset device, an amplifier transistor 114, and a selection transistor 115 with respect to one photodiode 111.

The photodiode 111 performs photoelectric conversion of an incident light into positive charge (here, electrons) according to its light quantity.

The transfer transistor 112 is connected between the photodiode 111 and a floating diffusion FD as an output node.

The transfer transistor 112 supplies a driving signal TG to its gate through a transfer control line LTx (transfer gate), and transmits electrons photoelectrically converted by the photodiode 111 that is a photoelectric conversion device to the floating diffusion FD.

The reset transistor 113 is connected between a power supply line LVDD and the floating diffusion FD.

The reset transistor 113 supplies a reset RST to its gate through a reset control line LRST, and resets the electric potential of the floating diffusion FD to the electric potential of the power supply line LVDD.

The floating diffusion FD is connected to the gate of the amplifier transistor 114. The amplifier transistor 114 is connected to a vertical signal line 116 through the selection transistor 115, and configures a constant current source and a source follower outside the pixel unit.

A control signal (address signal or selection signal) SEL is given to the gate of the selection transistor 115 through a selection control line LSEL, and thus the selection transistor 115 is conducted.

If the selection transistor 115 is conducted, the amplifier transistor 114 amplifies the electric potential of the floating diffusion FD, and outputs a voltage according to the electric potential to a vertical signal line 116. The voltage output from the pixel through the vertical signal line 116 is output to the column processing circuit group 150 as the pixel signal reading circuit.

Their operations are simultaneously performed in parallel with respect to the respective pixels for one row, for example, since the gates of the transfer transistor 112, the reset transistor 113, and the selection transistor 115 are connected in the unit of a row.

The reset control line LRST, the transfer control line LTx, and the selection control line LSEL, which are wired in the pixel unit 110, are wired in the unit of a row of the pixel arrangement in one set.

The reset control line LRST, the transfer control line LTx, and the selection control line LSEL are driven by the vertical scanning circuit 120 as the pixel driving unit.

In the solid-state imaging device 100, a timing control circuit 140 that generates an internal clock as a control circuit for sequentially reading the signals of the pixel unit 110, the vertical scanning circuit 120 that controls row addresses or row scanning, and the horizontal transfer scanning circuit 130 that controls the column addresses or column scanning are arranged.

The timing control circuit 140 generates timing signals that are necessary for signal processing of the pixel unit 110, the vertical scanning circuit 120, the horizontal transfer scanning circuit 130, the column processing circuit group 150, the DAC and bias circuit 160, the signal processing circuit 180, and the high luminance evaluation pattern generation unit 190.

The timing control circuit 140 includes a DAC control unit 141 that controls generation of a reference signal RAMP (Vslop) of the DAC 161 in the DAC and bias circuit 160.

The pixel unit 110 performs photoelectric conversion for each pixel row of an image or a screen image through photon accumulation and discharge using line shutters, and outputs the analog signal VSL to the respective column processing circuits 151 of the column processing circuit group 150.

In the ADC group 150, ADC blocks (respective column units) perform APGA correspondence integration type ADC and digital CDS of the analog output of the pixel unit 110 using the reference signal (ramp signal) RAMP from the DAC 161, and outputs a digital signal of several bits.

<2. Configuration Example of a Column ADC>

In the column processing circuit group 150 according to this embodiment, a plurality of columns of the column processing circuits (ADC) 151 that are ADC blocks are arranged.

That is, the column processing circuit group 150 has a k-bit digital signal conversion function, and is arranged for each of the vertical signal lines (column lines) 116-1 to 116-$n$ to configure a column parallel ADC block.

Each ADC 151 has a comparator 151-1 which compares a reference signal RAMP (Vslop) that is a ramp waveform obtained by changing the reference signal generated by the DAC 161 to a stepwise form with an analog signal Vsl that is obtained from the pixel via the vertical signal line for each row line.

Further, each ADC has a counter latch 151-2 that counts a comparison time and maintains the result of counting.

The output of each counter latch 151-2 is connected, for example, to a horizontal transfer line LTRF having a k-bit width.

Also, k amplifier circuits 170 that correspond to the horizontal transfer lines LTRF and a signal processing circuit 180 are arranged.

In the ADC group 150, the analog signal electric potential Vsl read from the vertical signal line 116 is compared with a reference signal Vslop (a ramp signal RAMP which is a slope waveform that is linearly changed with a certain slope) through a comparator 151-1 arranged in each column.

At this time, in the same manner as the comparator 151-1, the counter latch 151-2 arranged for each column is operated.

While the reference signal RAMP (electric potential Vslop) with a ramp waveform and the counter value are changed in a one-to-one manner, each ADC 151 converts the electric potential (analog signal) of the vertical signal line 116 into a digital signal.

The ADC 151, which converts the change of voltage of the reference signal RAMP (electric potential Vslop) into the change of time, converts the time into a digital value through counting of the time at a certain period (clock).

When the analog signal Vsl and the reference signal RAMP (Vslop) cross each other, the output of the comparator 151-1 is reversed, the input clock of the counter latch 151-2 is stopped, or the clock, of which the input has been stopped, is input to the counter latch 151-2 to complete the AD conversion.

After completion of the AD conversion period, the data maintained in the counter latch 151-2 is transferred to the horizontal transfer line LTRF by the horizontal transfer scanning circuit 130, and is input to the signal processing circuit 180 through the amplifier circuit 170 to generate a two-dimensional image through a predetermined signal process.

The horizontal transfer scanning circuit 130 performs simultaneous parallel transmission of several channels to secure a transfer speed.

The timing control circuit 140 prepares timing that is necessary for signal processing in the respective blocks such as the pixel unit 110, the column processing circuit group 150, and the like.

The following signal processing circuit 180 performs correction of a vertical line defect or point defect of the read signal, clamp processing of the signal, and a digital signal processing such as parallel-serial conversion, compression, encoding, addition, averaging, intermittent action, and the like.

In the solid-state imaging device 100 according to this embodiment, the digital output of the signal processing circuit 180 is transmitted as an input of an ISP or a baseband LSI.

In this case, as a technique that is used to read a pixel signal of a CMOS image sensor, there is a method of temporarily sampling signal charge that is an optical signal generated by a photoelectric conversion device such as a photodiode in its previous capacity through a MOS switch arranged near the signal charge, and reading the sampled signal.

In the sampling circuit, a noise having an inverse correlation with the sampling capacity value typically occurs. Since the signal charge is completely transferred using potential gradient when the signal charge is transferred to the sampling capacity in the pixel, no noise occurs in the sampling process, but in the case of resetting the voltage level of the previous capacity to a certain reference value, noise occurs.

As a technique to remove this, CDS (Correlated Double Sampling (CDS)) is adopted.

This is a technique that removes noise by reading and storing a state (reset level) just before the signal charge is once sampled and then reading and subtracting the signal level after the sampling.

The DAC 161, under the control of the DAC control unit 141, generates a reference signal (ramp signal) RAMP that is a slope waveform that is linearly changed with a certain slope, and supplies the reference signal RAMP to the column processing circuit group 150.

<3. First Configuration Example of a High Luminance Evaluation Pattern Generation Unit>

Figure 10:
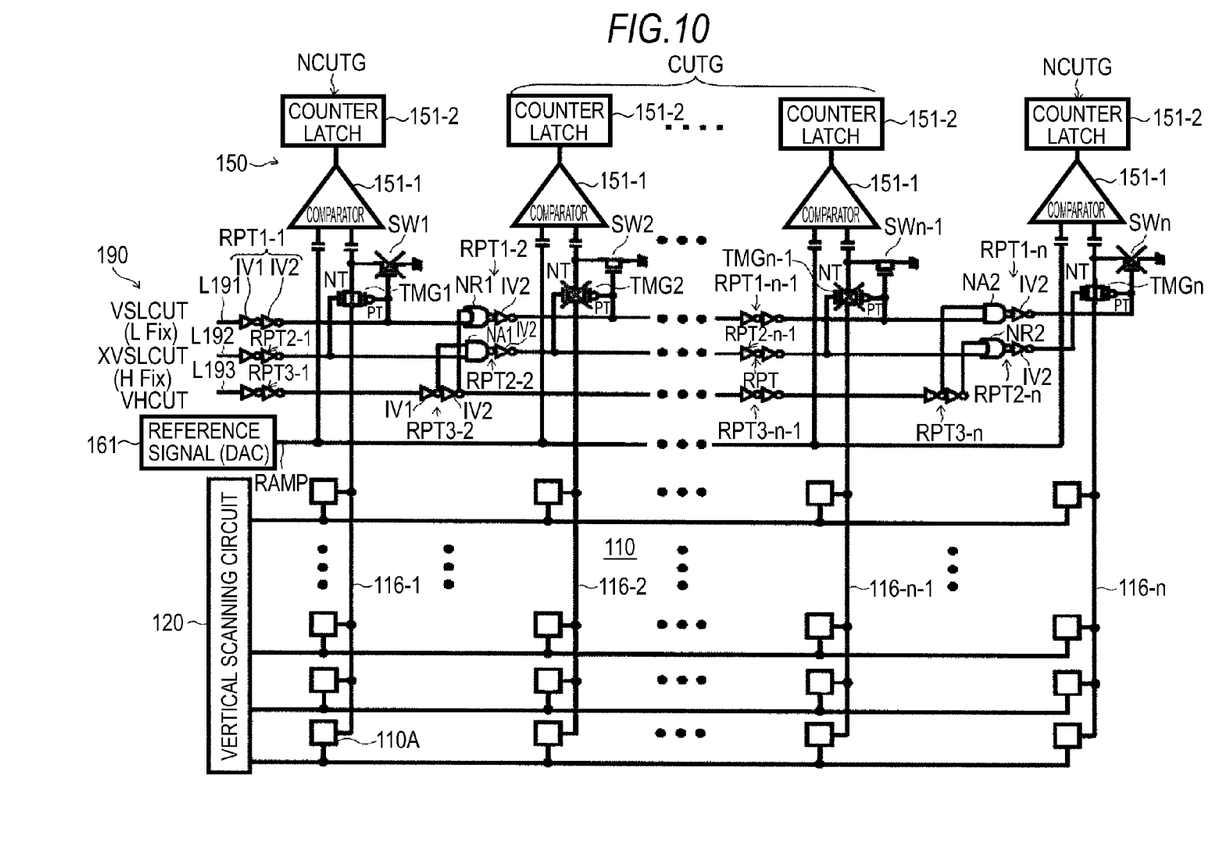
FIG. 10 is a diagram illustrating a first configuration example of a high luminance evaluation pattern generation unit according to an embodiment of the invention.

Next, the first configuration example of the high luminance evaluation pattern generation unit 190 will be described.

FIG. 10 is a diagram illustrating a first configuration example of a high luminance evaluation pattern generation unit according to an embodiment of the invention.

In FIG. 10, both the pixel unit and the column signal processing circuit group are illustrated.

In FIG. 10, since the configuration of the pixel unit 110 and the column signal processing circuit group 150 is the same as that illustrated in FIG. 8, the detailed description thereof will be omitted.

In FIG. 10, the column group of the successive vertical signal lines 116-2 to 116-n is separated as a light shielding group CUTG and one column or a plurality of columns on both sides of the light shielding group CUTG is separated as a non-light shielding group NCUTG.

In this example, the non-light shielding group NCUTG is formed by one columns on both terminals of the light shielding group, and the light shielding group CUTG is formed by the remaining columns. However, the number of columns may be diversely selected in accordance with the forming aspect of a light shielding pattern.

In the high luminance evaluation pattern generation unit 190, transfer gates TMG1 to TMGn are arranged in an input unit of the comparator 151-1 of each vertical signal line.

The transfer gates TMG1 to TMGn are configured by connecting sources and drains of a PMOS transistor PT and an NMOS transistor NT, respectively.

Also, in the input unit of the comparator 151-1 of each vertical signal line, the drain is connected to the input unit of the comparator 151-1, and the source is connected to switches SW1 to SWn which are formed by NMOS transistors connected to a reference electric potential VSS (electric potential corresponding to a black level).

In the high luminance evaluation pattern generation unit 190, a first interception signal line L191, through which an active vertical signal line interception signal VSLCUT is transferred at low level, is wired over the whole columns.

In the high luminance evaluation pattern generation unit 190, a second interception signal line L192, through which a reverse signal XVSLCUT of the vertical signal line interception signal VSLCUT is transferred, is wired over the whole columns.

Further, in the high luminance evaluation pattern generation unit 190, a control signal line L193, through which an active light shielding control signal VHCUT is transferred at high level, is wired over the whole columns.

Basically, the first interception signal line L191 is connected to the gates of PMOS transistors PT of transfer gates TMG1 to TMGn of the respective columns and the switches SW1 to SWn.

The second interception signal line L192 is connected to the gates of NMOS transistors NT of the transfer gates TMG1 to TMGn of the respective columns.

Also, in the first interception signal line L191, the second interception signal line L192, and the control signal line L193, except for a portion thereof, repeaters RPT, in which two inverters IV1 and IV2 are connected in series for each column, are arranged.

In the first interception signal line L191, repeaters RPT1-1 to RPT1-n are arranged, in the second interception signal line L192, repeaters RPT2-1 to RPT2-1 are arranged, and in the control signal line L193, repeaters RPT3-1 to RPT3-n are arranged.

However, exceptionally, in the high luminance evaluation pattern generation unit 190 of FIG. 10, a two-input NOR gate NR1, instead of a first-stage inverter, is arranged in the repeater RPT1-2 of the first interception signal line L191 in the second column in which the light shielding group CUTG starts.

The first interception signal line L191 is connected to one input of the NOR gate NR1, and the output of the second-stage inverter IV2 of the repeater RPT3-2 of the same column as the control signal line L193 is connected to the other input thereof.

In the high luminance evaluation pattern generation unit 190 of FIG. 10, a two-input NAND gate NA1, instead of a first-stage inverter, is arranged in the repeater RPT2-2 of the second interception signal line L192 in the second column in which the light shielding group CUTG starts.

The second interception signal line L192 is connected to one input of the NAND gate NA1, and the output of the first-stage inverter IV1 of the repeater RPT3-2 of the same column as the control signal line L193 is connected to the other input thereof.

Further, in the high luminance evaluation pattern generation unit 190 of FIG. 10, a two-input NAND gate NA2, instead of a first-stage inverter, is arranged in the repeater RPT1-n of the first interception signal line L191 in the n-th column in which the light shielding group CUTG is ended and the next non-light shielding group NCUT starts.

The first interception signal line L191 is connected to one input of the NAND gate NA2, and the output of the first-stage inverter IV1 of the repeater RPT3-n of the same column as the control signal line L193 is connected to the other input thereof.

In the high luminance evaluation pattern generation unit 190 of FIG. 10, a two-input NOR gate NR2, instead of a first-stage inverter, is arranged in the repeater RPT2-n of the second interception signal line L192 in the n-th column in which the light shielding group CUTG is ended and the next non-light shielding group NCUT starts.

The second interception signal line L192 is connected to one input of the NOR gate NR2, and the output of the second-stage inverter IV2 of the repeater RPT3-n of the same column as the control signal line L193 is connected to the other input thereof.

In the above-described configuration, the outputs of the repeaters RPT1-2 and RPT2-2 in the second column and the outputs of the repeaters RPT1-n and RPT2-n in the n-th column take reverse logic (complementary logic).

In the case of forming a light shielding pattern in the high luminance evaluation pattern generation unit 190 of FIG. 10, the vertical signal line interception signal VSLCUT at low level is transferred to the first interception signal line L191.

The reverse vertical signal line interception signal XVSLCUT at high level is transferred to the second interception signal line L192.

Also, the light shielding control signal VHCUT at high level is transferred to the control signal line L193.

In the first column, the vertical signal line interception signal VSLCUT at low level is supplied to the PMOS transistor PT of the transfer gate TMG1 and the switch SW1 through the repeater RPT1-1.

In the same manner, in the first column, the reverse vertical signal line interception signal XVSLCUT at high level is supplied to the gate of the NMOS transistor NT of the transfer gate TMG1 through the repeater RPT2-1.

Accordingly, in the first column, that is, in the non-light shielding group NCUT, the transfer gate TMG1 is conducted, and the switch SW1 is maintained in an off state. In this case, the analog signal VSL of the typical vertical signal line 116-1 is input to the comparator 151-1, and a typical column process (AD conversion process) is performed.

In the second column, that is, in the column in which the light shielding group CUTG starts, the output of the first-stage inverter IV1 of the repeater RPT3-2 of the control signal line L193 becomes a low level.

As a result, the reverse vertical signal line interception signal XVSLCUT that is output from the repeater RPT2-2 of the second interception signal line L192 at low level is supplied to the gate of the NMOS transistor NT of the transfer gate TMG2.

The output of the second-stage inverter IV2 of the repeater RPT3-2 of the control signal line L193 becomes a high level.

As a result, the vertical signal line interception signal VSLCUT at high level is supplied to the gates of the PMOS transistor PT of the transfer gate TMG2 and the switch SW2.

Accordingly, the transfer gate TMG2 is turned off, and the switch SW2 is turned on.

The light shielding group CUTG from the third column to the (n-1)-th column is in the same state as described above.

Accordingly, in the light shielding group CUTG, a column process (AD conversion process) of the artificially generated black level is performed.

In the n-th column, that is, in the column in which the shield group CUTG is ended and the next non-shield group NCUT starts, the output of the first-stage inverter IV1 of the repeater RPT3-n of the control signal line L193 becomes a low level.

As a result, the vertical signal line interception signal XVSLCUT that is output from the repeater RPT1-n of the first interception signal line L191 at a low level is supplied to the gate of the PMOS transistor PT of the transfer gate TMGn and the gate of the switch SWn.

The output of the second-stage inverter IV2 of the repeater RPT3-n of the control signal line L193 becomes a high level.

As a result, the reverse vertical signal line interception signal XVSLCUT at a high level is supplied to the gate of the NMOS transistor NT of the transfer gate TMGn.

Accordingly, in the n-th column, that is, in the non-light shielding group NCUT, the transfer gate TMGn is conducted, and the switch SWn is maintained in an off state. In this case, the analog signal VSL of the typical vertical signal line 116-n is input to the comparator 151-1, and a typical column process (AD conversion process) is performed.

Through the above-described operation, only a portion of the column is separated from the vertical signal line, and the input level of the comparator is DC-fixed.

Figure 11:
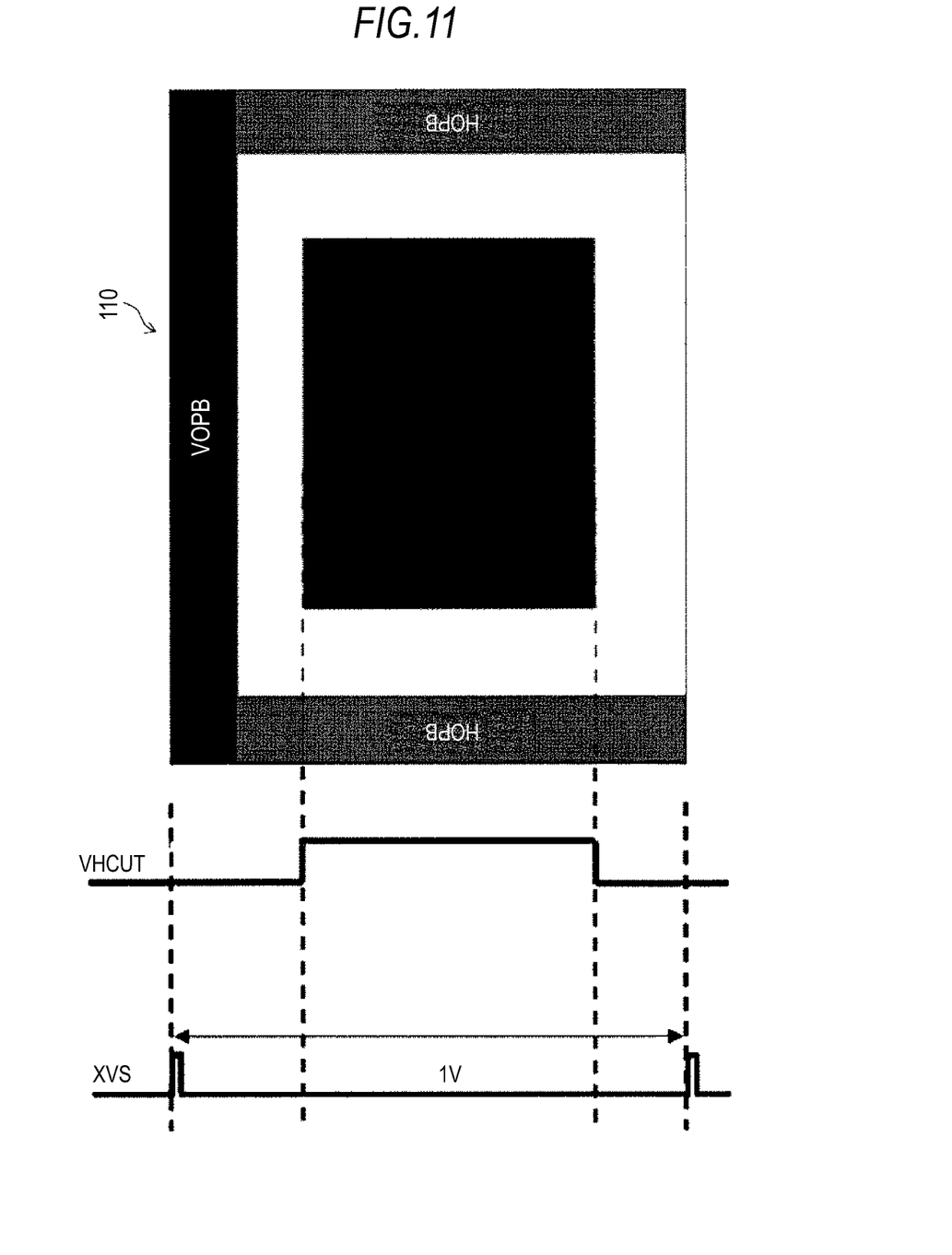
FIG. 11 is a diagram illustrating an evaluation pattern artificially generated in the high luminance evaluation pattern generation unit of FIG. 10.

Using this configuration, by making the signal effective only in any H period during 1V period, an output image as illustrated in FIG. 11 may be obtained.

Accordingly, in the same manner as the white high-luminance horizontal band evaluation pattern on the black background, a black high luminance horizontal band evaluation pattern on a white background is generated without the necessity of an external operation in light shielding, and thus the high luminance horizontal band caused after the AD conversion circuit is quantitatively measured.

Also, in the light shielding, since the evaluation pattern is made by changing the internal circuit state, the measurement having reproducibility is performed.

In a typical mode in which the evaluation pattern is not generated, the vertical signal line interception signal VSLCUT at a low level is transferred to the first interception signal line L191.

The reverse vertical signal line interception signal XVSLCUT at a high level is transferred to the second interception signal line L192.

Also, the light shielding control signal VHCUT at a low level is transferred to the control signal line L193.

<4. Second Configuration Example of a High Luminance Evaluation Pattern Generation Unit>

Figure 12:
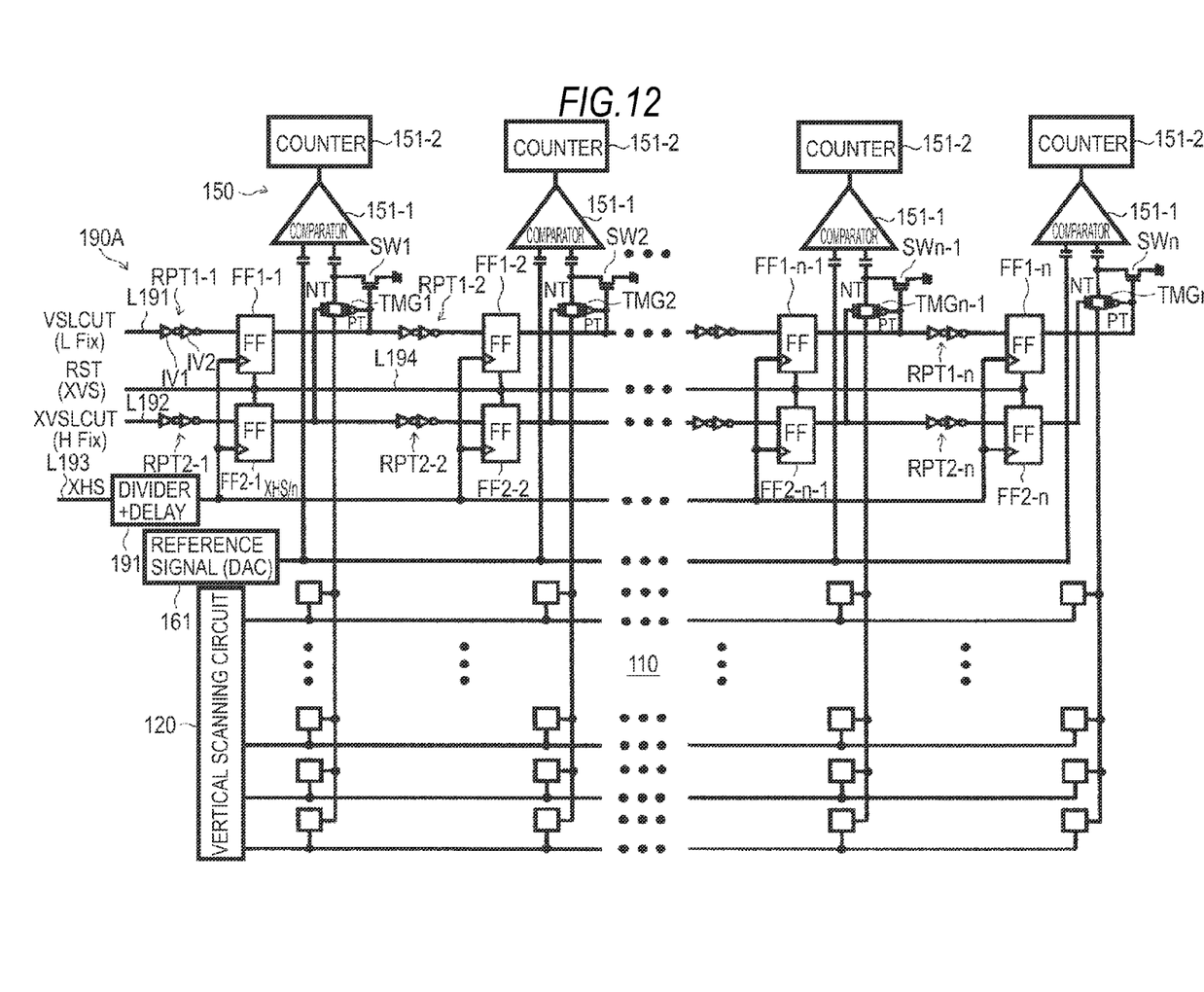
FIG. 12 is a diagram illustrating a second configuration example of a high luminance evaluation pattern generation unit according to an embodiment of the invention.

Next, the second configuration example of the high luminance evaluation pattern generation unit 190 will be described.

FIG. 12 is a diagram illustrating a second configuration example of a high luminance evaluation pattern generation unit according to an embodiment of the invention.

In FIG. 12, both the pixel unit and the column signal processing circuit group are illustrated.

In FIG. 12, since the configuration of the pixel unit 110 and the column signal processing circuit group 150 is the same as that illustrated in FIG. 8, the detailed description thereof will be omitted.

The difference between the high luminance evaluation pattern generation unit 190A of FIG. 12 and the high luminance evaluation pattern generation unit 190 of FIG. 10 is as follows.

In the high luminance evaluation pattern generation unit 190A, the light shielding group and the non-light shielding group are not accurately divided.

Repeaters RPT1-1 to RPT1-$n$ and RPT2-1 to RPT2-$n$, to which two inverters IV1 and IV2 of each column of the first interception signal line L191 and the second interception signal line L192 are connected in series, are arranged.

Also, flip-flops FF1-1 to FF1-$n$ and FF2-1 to FF2-$n$, of which data inputs D are connected to output terminals of the repeaters RPT1-1 to RPT1-$n$ and RPT2-1 to RPT2-$n$, are arranged.

The flip-flops FF1-1 to FF1-$n$ of the first interception signal line L191 are connected to the gates of PMOS transistors PT of the transfer gates TMG1 to TMGn of the corresponding columns and the gates of the switches SW1 to SWn.

The flip-flops FF2-1 to FF2-$n$ of the second interception signal line L192 are connected to the gates of NMOS transistors NT of the transfer gates TMG1 to TMGn of the corresponding columns.

Also, in the control signal line L193, a divider 191 is arranged, and a signal that is obtained by dividing a horizontal signal VHS by n is supplied as a clock of the respective flip-flops FF1-1 to FF1-$n$ and FF2-1 to FF2-$n$.

Also, a reset line L194 is wired to reset the flip-flops FF1-1 to FF1-$n$ and FF2-1 to FF2-$n$.

The high luminance evaluation pattern generation unit 190A of FIG. 12 is equivalent to the configuration in which shift registers composed of edge trigger D-type flip-flops are arranged in a column period that is suitable to the vertical signal line interception signal.

As a clock of the shift registers, a clock that is obtained by dividing the XHS at an appropriate dividing ratio and delaying the divided signal by one cycle is used.

Figure 13:
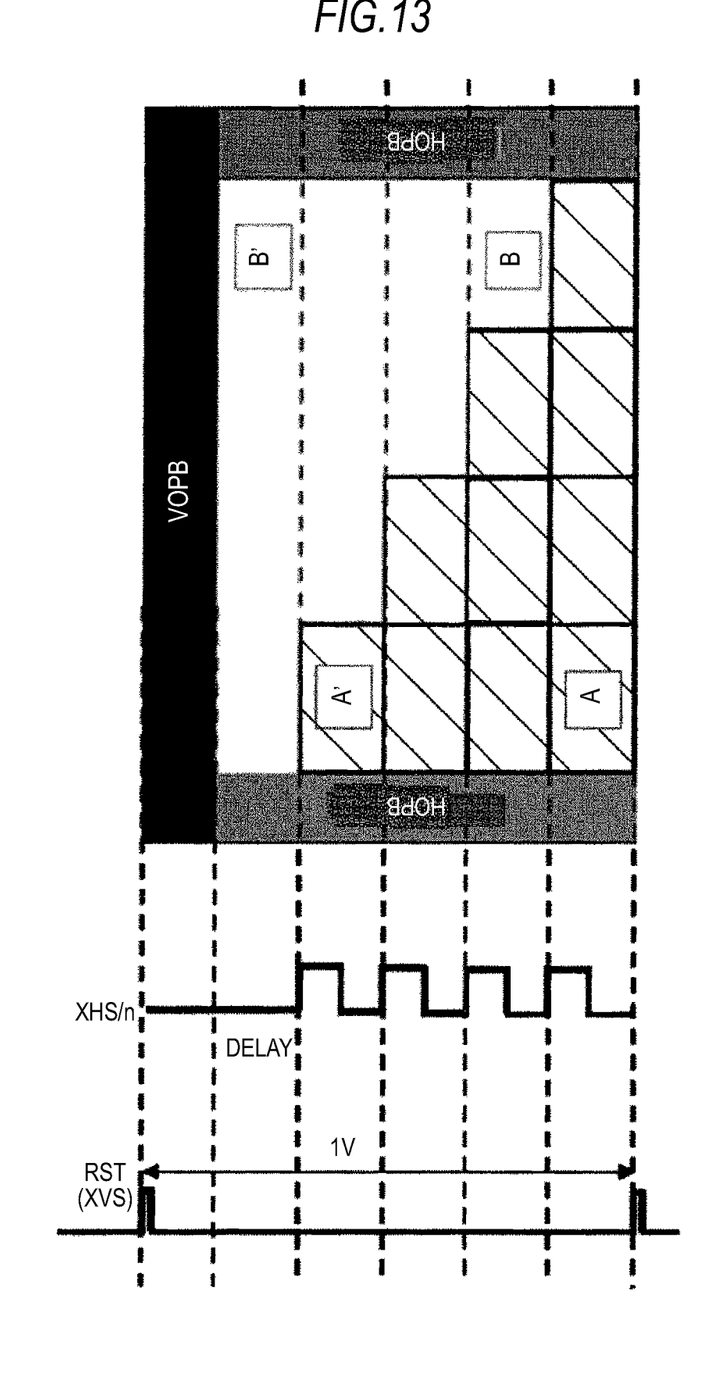
FIG. 13 is a diagram illustrating an evaluation pattern artificially generated in the high luminance evaluation pattern generation unit of FIG. 12.

Accordingly, a stepwise evaluation pattern is made from "the input of the comparator that is separated from the vertical signal line and DC-fixed "/" the input of the comparator that is typical in the vertical signal line" as illustrated in FIG. 13.

The merits of this evaluation pattern are that the white high-luminance horizontal band on the black background and the black high-luminance horizontal band on the white background are simultaneously measured in one sheet of image by respectively calculating a difference between average value outputs of A and A' and a difference between average value outputs of B and B' without the necessity of an external operation.

As described above, according to the solid-state imaging device according the embodiment of the invention, the following effects are obtained.

In the embodiment of the invention, an external operation is not necessary in light shielding, and a quantitative evaluation having reproducibility is performed.

Also, a quantitative evaluation having reproducibility is performed without the necessity of an external operation in light shielding, and the white high-luminance horizontal band on the black background and the black high-luminance horizontal band on the white background are simultaneously measured in one sheet of image.

As an example of the solid-state imaging device, the column parallel ADC mount-type solid-state imaging device has been exemplified. However, the present invention is not limited to the column parallel ADC mount type, and may be applied to diverse solid-state imaging devices including the column CDS type.

The solid-state imaging device having the above-described effects may be applied as an imaging device of a digital camera or a video camera.

<5. Configuration Example of a Camera System>

Figure 14:
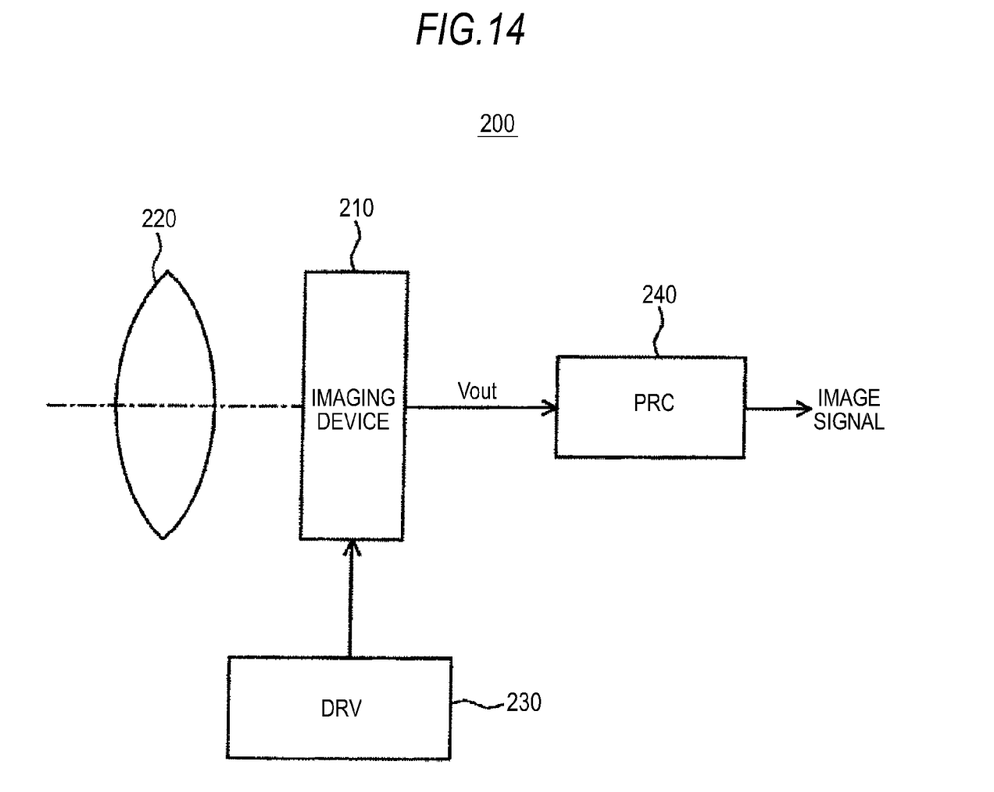
FIG. 14 is a diagram illustrating a configuration example of a camera system to which a solid-state imaging device is applied according to an embodiment of the invention.

FIG. 14 is a diagram illustrating a configuration example of a camera system to which a solid-state imaging device according to an embodiment of the invention is applied.

This camera system 200, as illustrated in FIG. 14, has an imaging device 210 to which a solid-state imaging device 10 according to the embodiment of the invention is applicable.

The camera system 200 includes a lens 220 forming an image of, for example, an incident light (optical image) on an imaging surface as an optical system that guides the incident light to a pixel area of the imaging device 210 (that forms an image of an object).

Further, the camera system 200 includes a driving circuit (DRV) 230 that drives the imaging device 210, and a signal processing circuit (PRC) 240 that processes an output signal of the imaging device 210.

The driving circuit 230 includes a timing generator (not illustrated) that generates various kinds of timing signals including a start pulse and a clock pulse for driving circuits in the imaging device 210, and drives the imaging device 210 with predetermined timing signals.

Also, the signal processing circuit 240 performs a predetermined signal process with respect to the output signal of the imaging device 210.

The image signal processed by the signal processing circuit 240, for example, is recorded in a recording medium such as a memory or the like. The image information recorded in the recording medium is hard-copied by a printer or the like. Also, the image signal processed by the signal processing circuit 240 is projected onto a monitor composed of a liquid crystal display or the like as a moving image.

As described above, in the imaging device such as a digital still camera, the above-described solid-state imaging device 100 is mounted as the imaging device 210, and thus a high-precision camera is realized.

The present application contains subject matter related to that disclosed in Japanese Priority Patent Application JP 2010-111306 filed in the Japan Patent Office on May 13, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel unit in which a plurality of pixels that perform photoelectric conversion are arranged in the form of a matrix, wherein each of the pixels includes a photodiode;
a pixel signal reading unit configured to read a pixel signal in a signal line from the pixel unit, and perform column signal processing with respect to an input signal;
an evaluation pattern generation unit configured to receive a control signal and one or more signal line interception signals and generate a pseudo-evaluation pattern according to the control signal, wherein the evaluation pattern generation unit is configured to separate a signal line of a column of pixels that is designated by the control signal from the pixel unit, connect the separated signal line to a fixed electric potential having a level according to the pseudo-evaluation pattern, and supply the corresponding signal to the pixel signal reading unit as a signal subject to the column signal process, wherein the evaluation pattern generation unit includes:
a plurality of transfer gates of which the conduction states are controlled by the one or more signal line interception signals on respective signal lines; and
switches of which the conduction states are controlled in accordance with the one or more signal line interception signals with respect to signal lines close to a pixel signal reading unit side rather than the transfer gates and the fixed electric potential,
wherein
the evaluation pattern generation unit is configured to divide a column group of successive signal lines as a light shielding group and divide one column or a plurality of columns except for the corresponding light shielding group as a non-light shielding group,
the evaluation pattern generation unit is configured to control the transfer gates in the columns of the light shielding group that is designated by the control signal to be in a non-conduction state and control the switches in the same column to be in a conduction state, and
the evaluation pattern generation unit is configured to control the transfer gates in the columns of a non-light shielding group to be in a conduction state and control the switches in the same column to be in a non-conduction state.

2. A solid-state imaging device comprising:
a pixel unit in which a plurality of pixels that perform photoelectric conversion are arranged in the form of a matrix, wherein each of the pixels includes a photodiode;
a pixel signal reading unit performing reading of a pixel signal in a signal line from the pixel unit, and performing column signal processing with respect to an input signal;
an evaluation pattern generation unit receiving a control signal and a one or more signal line interception signals and generating a pseudo-evaluation pattern according to the control signal;
a plurality of transfer gates of which the conduction states are controlled by the signal line interception signals on respective signal lines; and
switches of which the conduction states are controlled in accordance with the signal line interception signals with respect to the signal lines close to a pixel signal reading unit side rather than the transfer gates and a fixed electric potential,
wherein the evaluation pattern generation unit controls a transfer gate in a column that is designated by the control signal to be in a non-conduction state, and controls a switch in the same column to be in a conduction state, and
the evaluation pattern generation unit controls a transfer gate in a column that is not designated by the control signal to be in a conduction state, and controls a switch in a same column to be in a non-conduction state, wherein the evaluation pattern generation unit has shift registers shifting the signal line interception signals for each column in synchronization with a clock, and controls the conduction states of the transfer gates and the switches of each column by respective column outputs of the shift registers.

3. The solid-state imaging device according to claim 1, wherein the pixel signal reading unit includes:
a plurality of comparators configured to compare electric potentials of a reference signal that is a ramp wave and read analog signals of pixels of a corresponding column; and
a plurality of counter latches arranged to correspond to the plurality of comparators to count comparison times of the corresponding comparators, to stop the count if the outputs of the corresponding comparators are reversed, and to maintain the corresponding count values.

4. The solid-state imaging device according to claim 1, wherein the fixed electric potential is a level that corresponds to a black level.

5. A camera system comprising:
a solid-state imaging device; and
an optical system forming an image of an object on the solid-state imaging device, wherein the solid-state imaging device includes:
a pixel unit in which a plurality of pixels that perform photoelectric conversion are arranged in the form of a matrix, wherein each of the pixels includes a photodiode;
a pixel signal reading unit configured to read a pixel signal in a signal line from the pixel unit, and perform column signal processing with respect to an input signal;
an evaluation pattern generation unit configured to receive a control signal and one or more signal line interception signals and generate a pseudo-evaluation pattern according to the control signal, wherein the evaluation pattern generation unit is configured to separate a signal line of a column of pixels that is designated by the control signal from the pixel unit, connect the separated signal line to a fixed electric potential having a level according to the pseudo-evaluation pattern, and supply the corresponding signal to the pixel signal reading unit as a signal subject to the column signal process, wherein the evaluation pattern generation unit includes:

a plurality of transfer gates of which the conduction states are controlled by the one or more signal line interception signals on respective signal lines; and switches of which the conduction states are controlled in accordance with the one or more signal line interception signals with respect to signal lines close to a pixel signal reading unit side rather than the transfer gates and the fixed electric potential, wherein the evaluation pattern generation unit is configured to divide a column group of successive signal lines as a light shielding group and divide one column or a plurality of columns except for the corresponding light shielding group as a non-light shielding group, the evaluation pattern generation unit is configured to control the transfer gates in the columns of the light shielding group that is designated by the control signal to be in a non-conduction state and control the switches in the same column to be in a conduction state, and the evaluation pattern generation unit is configured to control the transfer gates in the columns of a non-light shielding group to be in a conduction state and control the switches in the same column to be in a non-conduction state.

6. The camera system according to claim 5, wherein the pixel signal reading unit includes:

a plurality of comparators configured to compare electric potentials of a reference signal that is a ramp wave and read analog signals of pixels of a corresponding column; and a plurality of counter latches arranged to correspond to the plurality of comparators to count comparison times of the corresponding comparators, to stop the count if the outputs of the corresponding comparators are reversed, and to maintain the corresponding count values.

7. The camera system according to claim 5, wherein the fixed electric potential is a level that corresponds to a black level.

* * * * *